Sept. 9, 1969            T. M. JABLON            3,465,888
SEDIMENTATION TANK WITH LIFTING DEVICE FOR
PIER-SUPPORTED RAKING MECHANISM
Filed Jan. 26, 1967            6 Sheets-Sheet 2
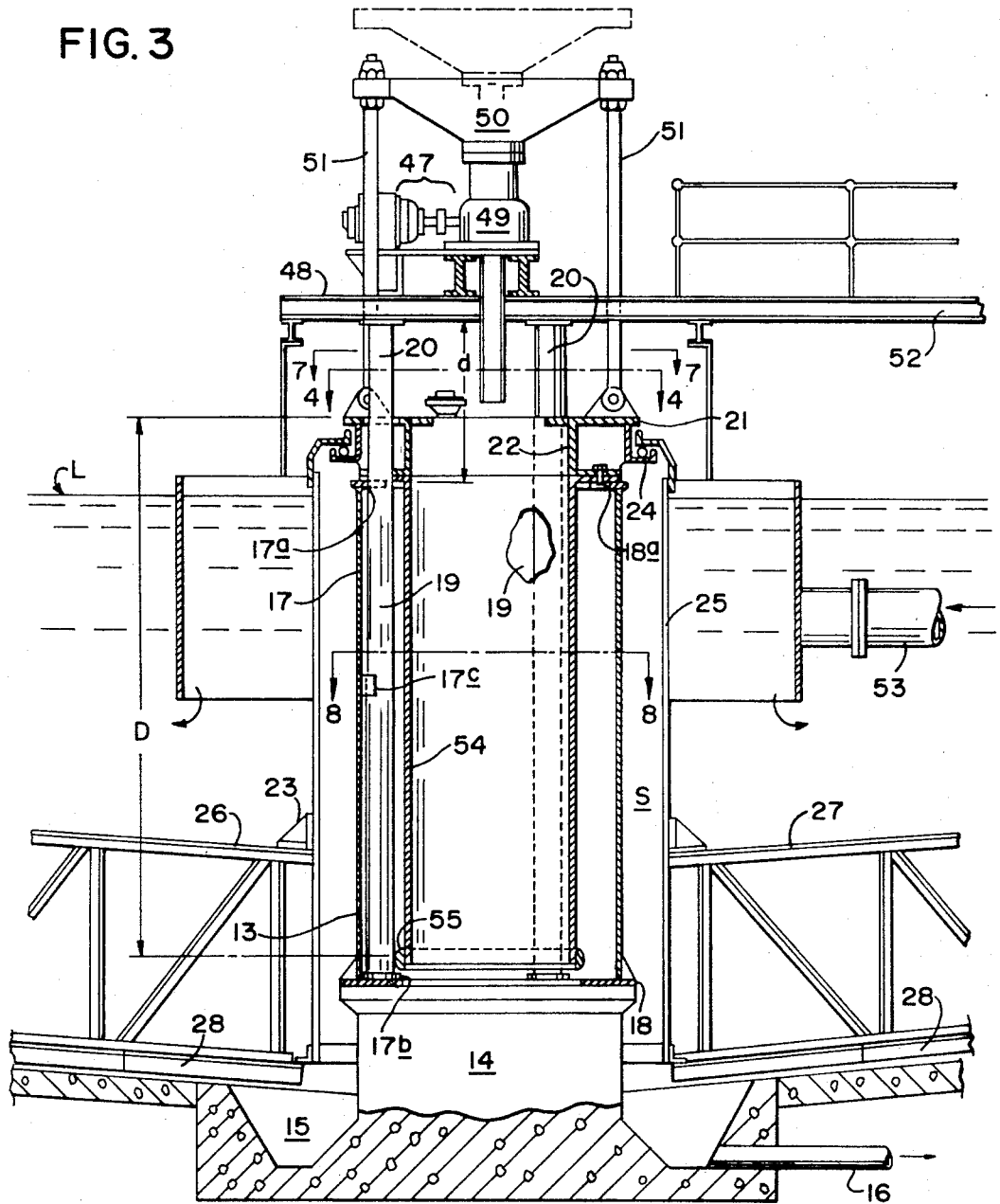
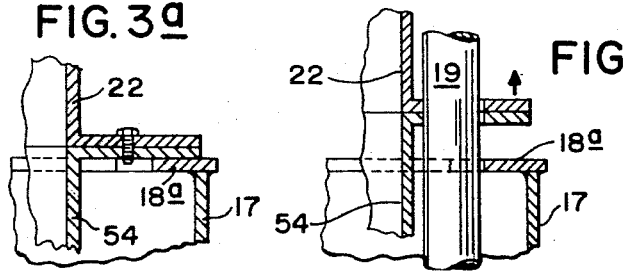
INVENTOR.
THEODORE M. JABLON
BY *Theodore M. Jablon*
ATT'Y Sept. 9, 1969   T. M. JABLON   3,465,888
SEDIMENTATION TANK WITH LIFTING DEVICE FOR
PIER-SUPPORTED RAKING MECHANISM
Filed Jan. 26, 1967                                             6 Sheets-Sheet 3
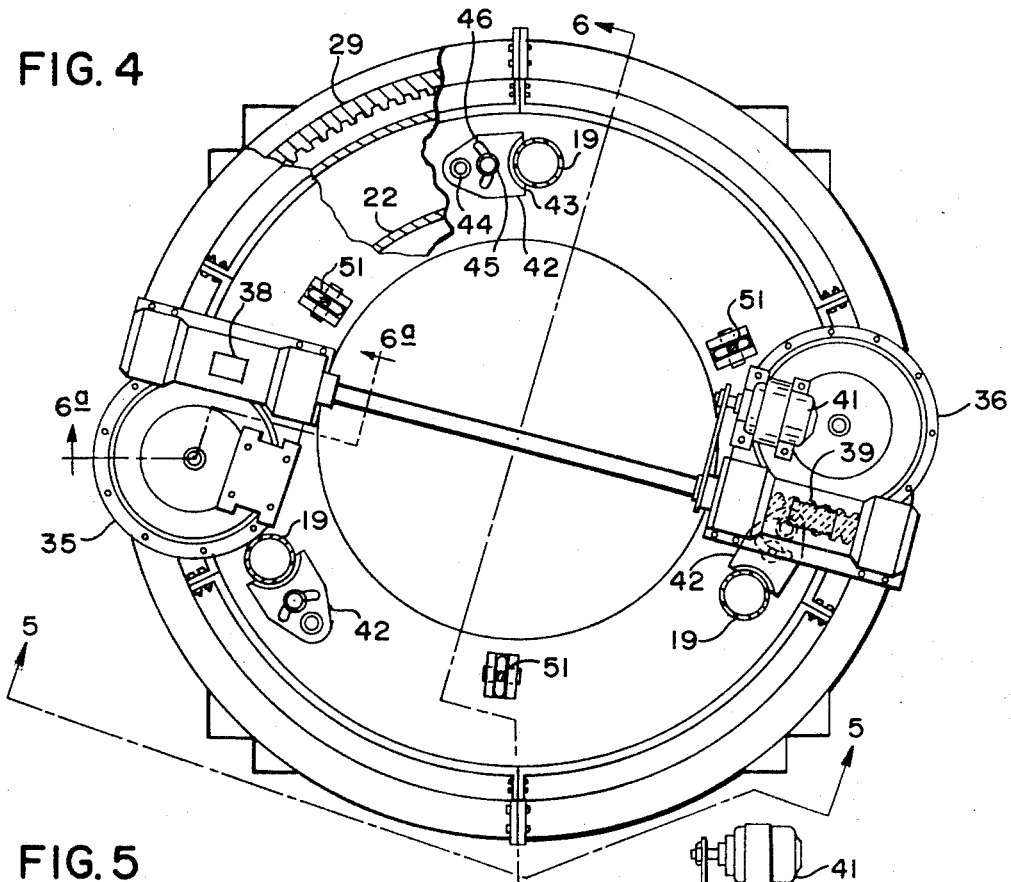
FIG. 4
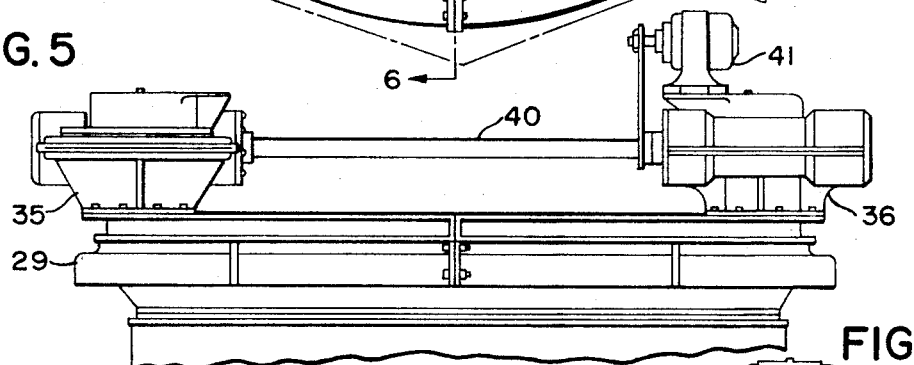
FIG. 5
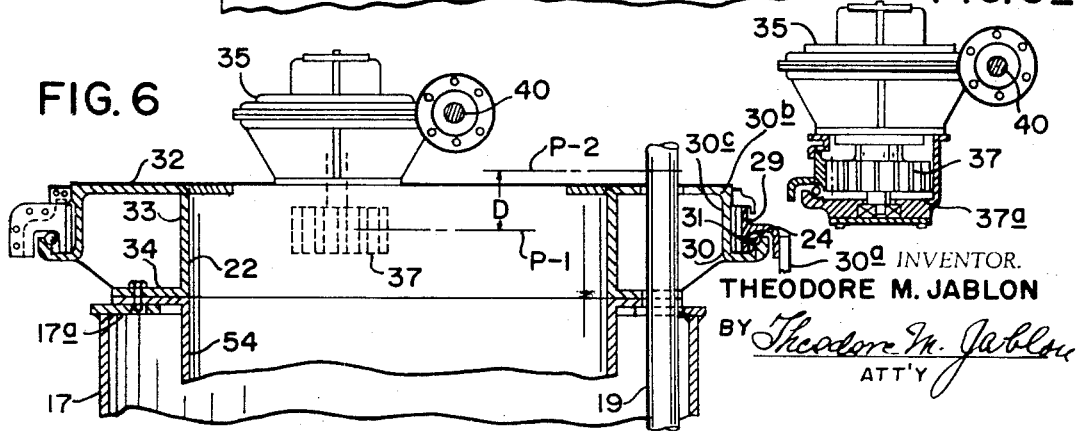
FIG. 6       FIG. 6ª
INVENTOR.
THEODORE M. JABLON
BY *Theodore M. Jablon*
ATT'Y Sept. 9, 1969 T. M. JABLON 3,465,888
SEDIMENTATION TANK WITH LIFTING DEVICE FOR
PIER-SUPPORTED RAKING MECHANISM
Filed Jan. 26, 1967 6 Sheets-Sheet 4

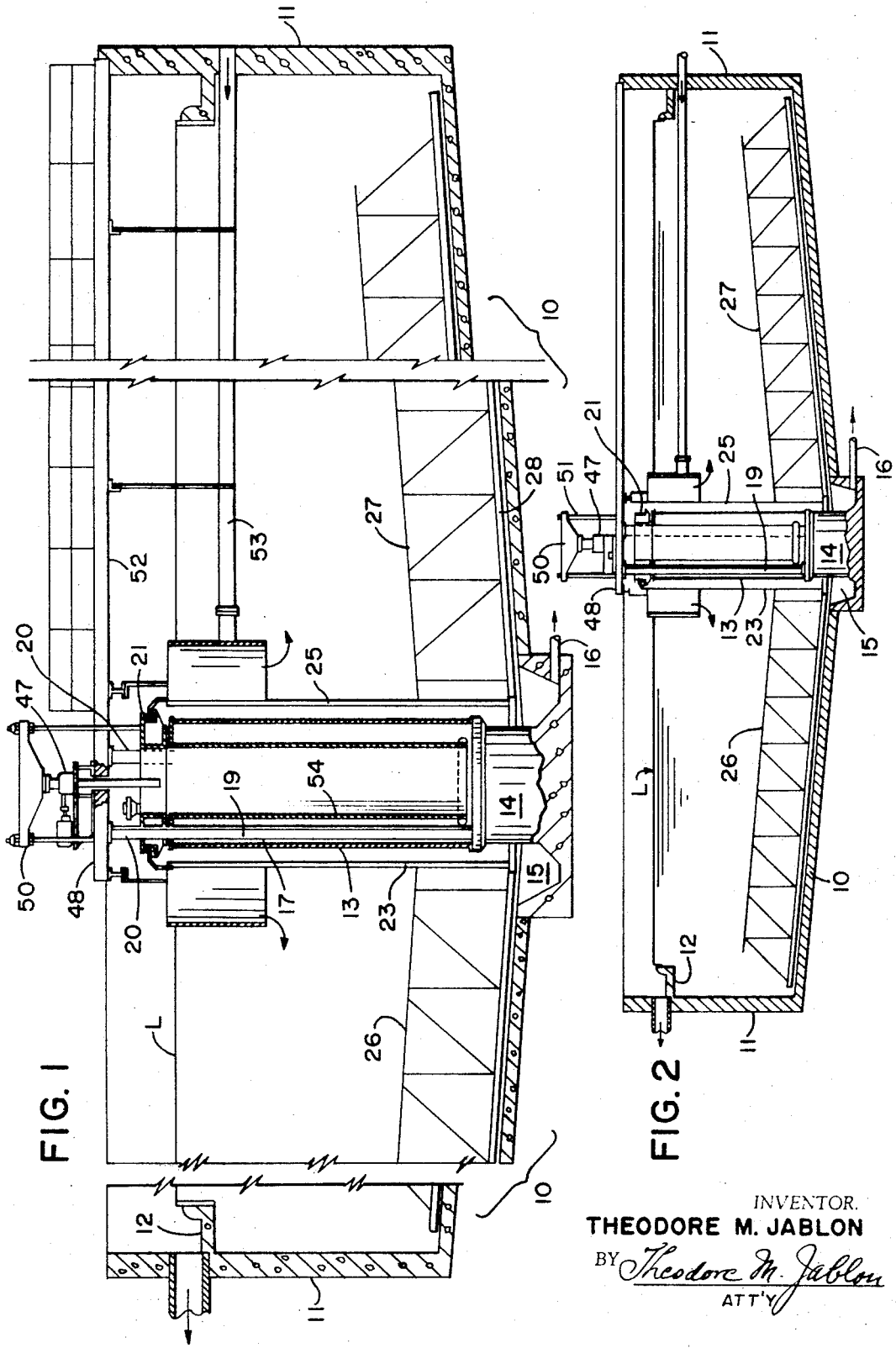

INVENTOR.
THEODORE M. JABLON

Sept. 9, 1969     T. M. JABLON     3,465,888
SEDIMENTATION TANK WITH LIFTING DEVICE FOR
PIER-SUPPORTED RAKING MECHANISM Filed Jan. 26, 1967     6 Sheets-Sheet 5

INVENTOR.
THEODORE M. JABLON
BY *Theodore M. Jablon*
ATT'Y

United States Patent Office 3,465,888
Patented Sept. 9, 1969

3,465,888
SEDIMENTATION TANK WITH LIFTING DEVICE
FOR PIER-SUPPORTED RAKING MECHANISM
Theodore M. Jablon, Stamford, Conn., assignor to Dorr-Oliver Incorporated, Stamford, Conn., a corporation of Delaware
Filed Jan. 26, 1967, Ser. No. 611,851
Int. Cl. B01d 21/12, 21/00
U.S. Cl. 210—531
38 Claims

ABSTRACT OF THE DISCLOSURE

A sedimentation tank with center-pier supported rotary rake structure and rake lifting means, wherein the raising and lowering of the rake structure is guided by vertical tracks provided by at least three columns spaced evenly about the axis of rotation of the rake structure.

---

This invention relates to continuously operating sedimentation tanks wherein a drive head is supported on a stationary structure or pier rising from the tank bottom, and the turntable base of the drive head in turn supports a sediment-engaging or sludge-conveying structure for rotation about the pier.

The rotary rake structure normally comprises sediment engaging rake arms extending from a central vertical cage portion which surrounds the pier and is supported from the turntable base. A bull gear is connected to the top end of the cage portion concentric therewith, which may be driven by a pinion drive unit or the like mounted on the turntable base. The rotating rake structure may operate in such a manner as to convey sediment or sludge over the tank bottom inwardly to a zone of discharge or sump surrounding the foot end of the pier, whence the collected sludge may be pumped away. Usually, the pier also supports the inner end of a radially extending bridge or truss the outer end of which is supported at the periphery of the tank.

More particularly, this invention relates to rake lifting mechanism operable for bodily raising and lowering such a rake structure for the purpose of overcoming or correcting a condition of sludge overload.

It is among the objects of this invention to provide improved rake lifting means associated with the pier, which are of great simplicity and ruggedness, simple and relatively inexpensive to fabricate as well as simple to erect.

A problem in connection with such lifting mechanism is how to provide anti-tilting stability for the rake structure, as well as to avoid binding, in the vertical movement of the structure. The invention, therefore, aims to provide rake lifting apparatus of great anti-tilting stability, and whereby the rake structure may be raised without binding, even while being rotated against a load.

The foregoing objects of the invention are attainable by having the turntable base together with the rake structure movable up and down along a system or plurality of vertical tracks which are in the form of columns rigidly connected to the pier, and which extend upwardly from the top end of the pier within the area surrounded by the bull gear and the cage portion. These guide columns secure the turntable base against rotation, while absorbing the torque reaction from the turntable base.

Another object is to provide a hollow center pier construction suited for standard operation, that is readily adaptable or convertible for rake lifting operation.

A lower portion of the columns may extend downwardly into the interior of a hollow pier, the downwardly extending portion being fixed rigidly to the pier. A horizontal frame spaced upwardly from the drive head may rigidly interconnect the upper ends of the columns, which frame or platform in turn may serve as a support for the inner end of the bridge.

For anti-tilting stability of the rake structure, the turntable base has fixed to the underside thereof a depending guide structure extending down into a hollow pier, and cooperating with vertical guide means provided within this hollow pier.

According to one feature, the columns themselves may provide guidance for the lower end of the guide structure depending from the turntable base.

Another feature lies in the provision of complementary guide means cooperating with the columns, and mounted on the turntable base.

Preferably, an arrangement of three guide columns spaced about the vertical axis of rotation, insures non-binding up and down movement of the turntable base.

It is among the advantages of this invention that the hollow pier structure and the guide columns rigidly connected thereto constitute a unitary construction of great rigidity and torque resistance.

Other features and advantages will hereinafter appear.

FIG. 1 is a semi-diagrammatic vertical sectional view of a settling tank embodying the improved rake lifting means for a pier-supported rake structure, including a novel arrangement of vertical guide columns serving as tracks when raising and lowering the assembly of the turntable base and the rake structure.

FIG. 2 is an enlarged view of the settling tank similar to the one in FIG. 1, although foreshortened, showing more clearly the improved centerpier construction with the rake lifting means.

FIG. 3 is an enlarged detail view taken from FIG. 2, of the centerpier construction and rake lifting means embodying the invention.

FIGS. 3a and 3b taken from FIG. 3, show details of the connection between the turntable base member and the depending guide member.

FIG. 4 is a cross-sectional view taken on line 4—4 in FIG. 3, showing a top view of the drive head for the rake structure, including a pair of mechanically inter-balanced pinion drive units, along with a preferred arrangement of guide columns or tracks.

FIG. 5 is a side view of the drive head, taken on line 5—5 in FIG. 4.

FIG. 6 is a vertical sectional view taken on line 6—6 in FIG. 4.

FIG. 6a is a vertical detail sectional view taken on line 6a—6a in FIG. 4, showing the construction of the pinion drive units.

Figure 7:
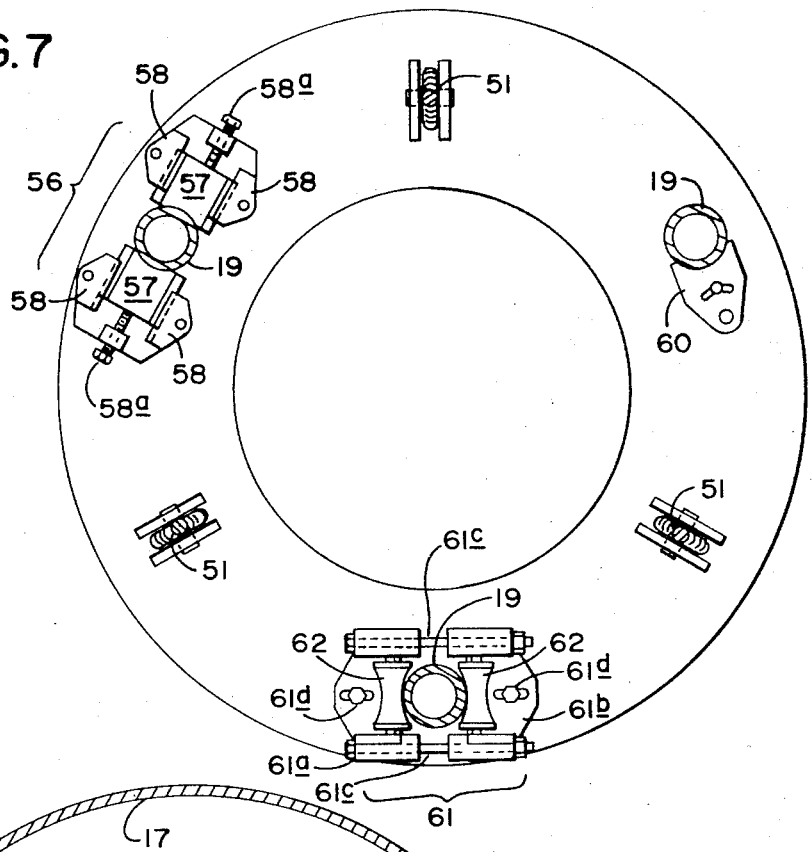

FIG. 7 is a detail cross-section taken on line 7—7 in FIG. 3, omitting the drive units, but showing modified guide track means.

Figure 8:
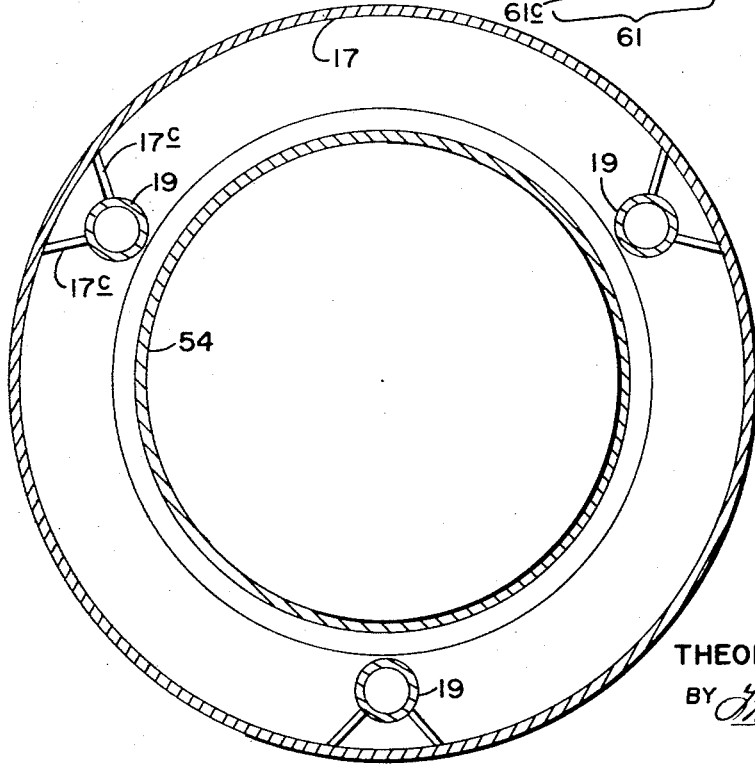

FIG. 8 is a detail cross-section taken on line 8—8 in FIG. 3, further illustrating the guide track means.

Figure 9:
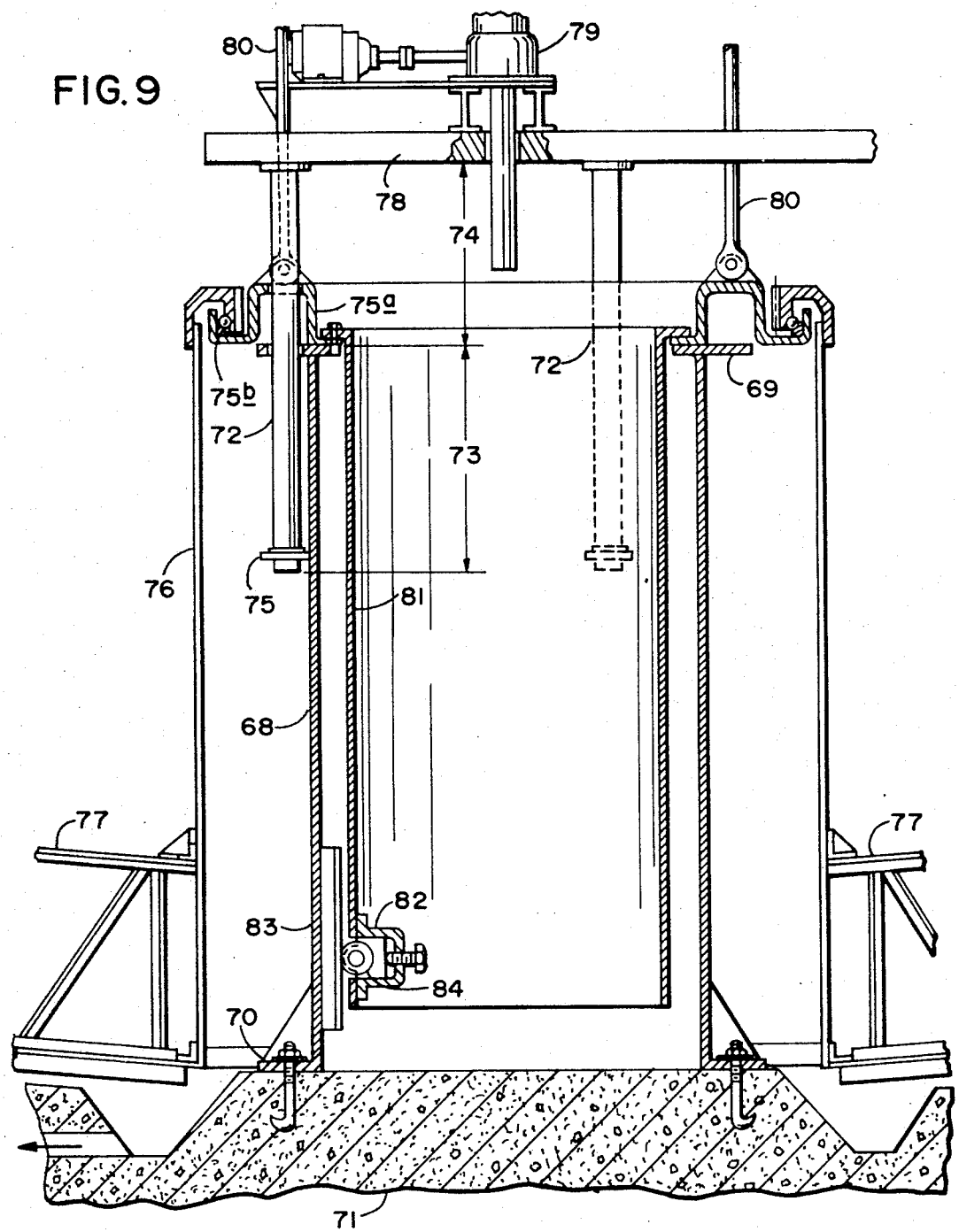

FIG. 9 shows another embodiment of the triple track guiding feature of the invention.

Figure 10:
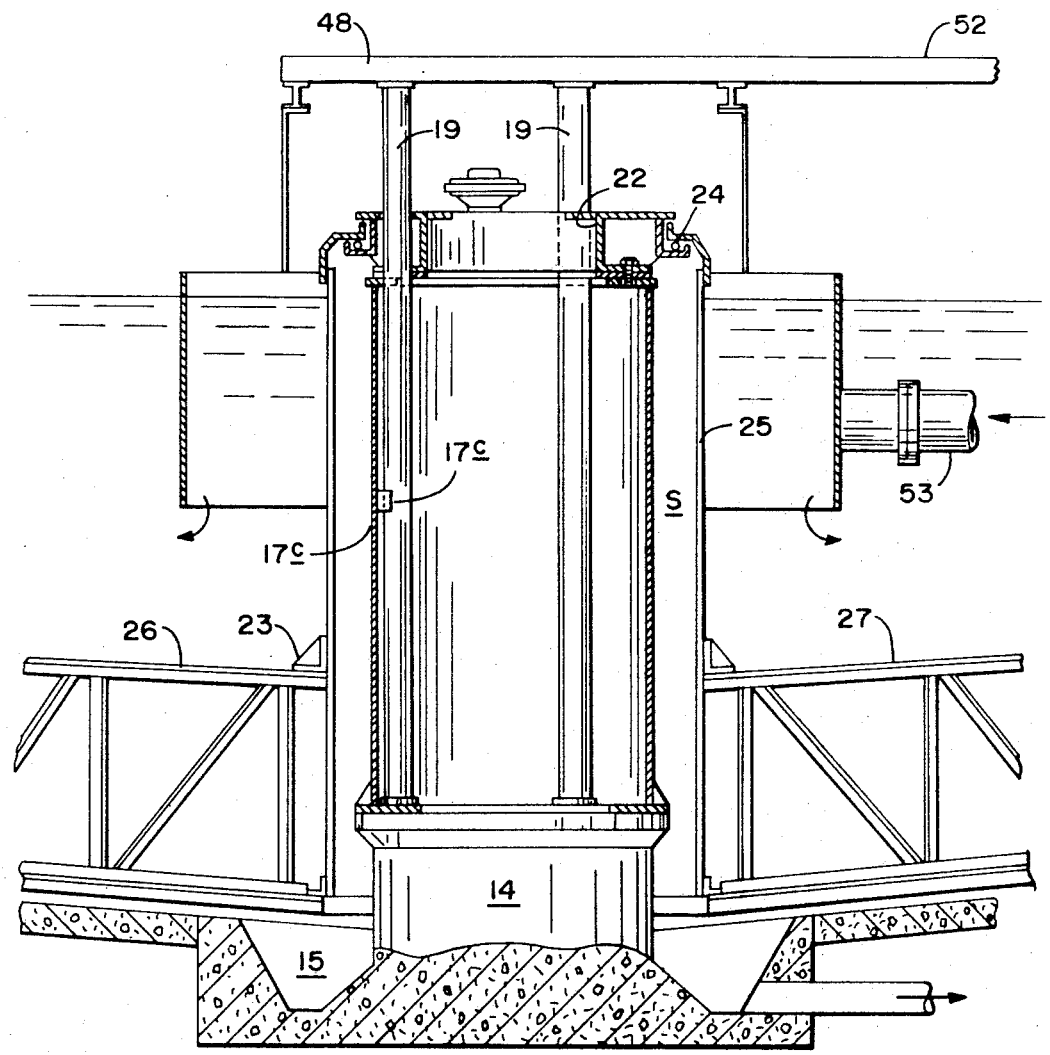

FIG. 10 shows the centerpier construction of FIG. 3 embodying the triple track guide columns of the invention, stripped of the lifting mechanism.

A continuously operating sedimentation tank of the centerpier type embodying the invention as illustrated in FIGS. 1, 2, 3, comprises a bottom 10, and a peripheral wall 11 provided with annular overflow launder 12. A hollow centerpier 13 in the present example comprises a solid footing or cylindrical base portion 14 in the center of the tank surrounded by an annular sump 15 from which collected sludge may be withdrawn or pumped as indicated by a conduit 16. A relatively tall hollow cylindrical member 17 extends upwardly from the footing substantially concentric therewith to a height at least slightly above the liquid level L as defined by the overflow weir of the launder. The cylindrical member has an outward bottom flange 18 solidly anchored to the footing, and an inward top flange 18a.

Within the cylindrical member in this embodiment there is provided a set of three column members 19 rigidly connected to the cylindrical member adjacent to the inner wall surface thereof and spaced uniformly from one another about the vertical axis of the centerpier. The column members in this embodiment are of a height exceeding that of the cylindrical member by a distance d. These columns thus present exposed upper end portions 20 which serve as guide tracks for the vertical movement of a drive head 21 which has a turntable base 22 rotatably supporting a rake structure 23 through an annular thrust bearing 24. The columns 19 in FIG. 3 are fixed or welded to the upper and the lower end of cylindrical member 17, that is at points 17a and 17b, as well as intermediately by brace elements 17c (see FIGS. 3 and 8) shown to be welded in place, thus lending additional strength and rigidity to the centerpier construction.

The rake structure may be of suitable standard construction comprising central vertical cage portion 25 surrounding the centrpier concentric therewith, and from the lower end of which extend a pair of rake arms 26 and 27. The arms are in the form of trusses to the underside of which are fixed the customary raking blades 28 arranged and effective to convey sediment or sludge over the tank bottom into the annular collecting sump when the rake structure is rotated about the centerpier. The construction of the drive head including one or more motorized gear drive units, and the manner of rotatably supporting the rake structure are shown in greater detail in FIGURES 4, 5, and 6. Accordingly, the cage portion 25 has fixed to the upper end thereof an inwardly overhanging internally toothed bull gear 29. The overhanging portion of the bull gear lodges in an annular oil trough 30 which is part of the turntable base, and which also contains the annular thrust bearing means indicated by anti-friction bearing elements or balls 31. Lubrication for both the ball bearing and the bull gear is provided by the oil bath in the trough which has a low outer peripheral wall 30a, a higher inner perpiheral wall 30b, and an annular horizontal bottom 30c interconnecting these walls.

The turntable base as herein exemplified further comprises an annular horizontal plate or platform portion 32 extending inwardly from the upper end of the annular trough, a cylindrical neck portion 33 extending downwardly from the plate portion 32, and in turn terminating in a bottom flange 34.

A pair of pinion drive units 35 and 36 are mounted on the plate portion of the turntable base, each having a drive pinion 37 accommodated in a pocket 37a formed in the oil-containing annular trough. The drive units are interbalanced so that each will assume one half the driving torque for rotating the rake strutceure, the torque reaction force being absorbed by the aforementioned columns or tracks. Each drive unit comprises worm drive means including a horizontal worm member. The two worm members 38 and 39 are coaxially aligned and axially shiftable, but interconnected by a shaft 40 so that the two worms and the shaft may shift axially as a single element thus balancing the torque between the two drive units. Driving power for both units may be applied from a single motor 41 mounted on one of the drive units and imparting driving torque to the shaft.

The three columns or tracks extend through correspondingly shaped openings in the platform portion of the turntable base, and cooperate with respective wear members or bearing blocks 42 mounted topside upon the platform portion (see FIG. 4). In this example the bearing block has a wear face 43 conforming to the curvature of the column or track. The block is pivotally mounted at 44 so that the wear face may adjust itself to the curvature of the track. The block is held in place on the platform portion by a bolt 45 extending through an arcuate slot 46 in the block. These bearing blocks provide the guide and wear faces when the turntable is raised or lowered together with the rake structure along the tracks, while also absorbing the drive torque reaction forces.

With normal operating conditions the drive head with the rake structure may rest upon the top end flange of the centerpier. However, the raising and lowering of the rake structure may be effected by means of an overhead lifting device 47 mounted upon a horizontal frame structure 48 rigidly interconnecting the upper ends of the columns. For example, a jack device 49 may raise or lower a crosshead 50 connected by tension rods 51 to the platform portion of the turntable base.

The frame structure 48 also supports the inner end of a bridge construction 52 extending radially of the tank. A cylindrical feed well concentric with the axis of rotation of the rake structure, is suspended from the frame structure 48, and supplied by a feed conduit 53.

Ample anti-tilting stability, according to the invention, is provided for the turntable base and the rake structure. That is to say, a cylindrical guide member 54 of significant length extends downwardly from the underside of the turntable base into the hollow of the pier, and is rigidly connected to said base. With the columns thus located in the annular space S between the guide member 54 and the surrounding hollow pier, an effective vertical anti-tilting base of the length D is provided by the lower end portion of the columns acting as vertical guide tracks engaging the lower end portion 55 of the depending guide member 54 (see FIGS. 3 and 8).

FIG. 7 shows various embodiments of guide or bearing means mounted atop the turntable base and associated with respective columns or tracks. For instance, a guide bearing device 56 cooperating with a column member 19 comprises a pair of opposedly arranged bearing blocks 57 adjustable towards and away relative to each other and relative to the column member. These blocks are adjustable along a horizontal line, each between parallel horizontal guides 58, by means of respective adjustment screws 58a. In a second embodiment as represented by the guide bearing device 60, the column member 19 cooperates with a guide bearing device substantially similar to the guide block means described above in FIG. 4. In a third embodiment, a guide bearing device 61 comprises guide rollers 62 of convex or saddle-shaped configuration cooperating with the cylindrical face of the associated column member 19.

Each roller 62 is mounted in a pair of bearing blocks 61a fixed upon a base plate 61b. The two base plates are horizontally aligned with each other by a pair of parallel bolts 61c which may also serve to adjust the two base plates toward and away with respect to each other. The base plates in turn are adjustably fixed to the turntable base by means of bolt-and-slot connections 61d.

FIG. 9 is an enlarged view of another center pier construction embodying the invention. In this embodiment a hollow cylindrical member or pier 68 has a flange 69 at the top and a bottom flange 70 anchored to the central base portion 71 of the settling tank. A set of at least three column members or tracks 72 are connected to the outside of the tank adjacent to the outer face thereof. The columns have a lower portion 73 extending downwardly from the top end of the pier, and an upper portion 74 extending upwardly from the top end of the pier. These columns are rigidly connected to the tank for instance by being fixed to the top flange 69 and to a bracket 75 which in turn is welded to the tank.

The drive head may be similar to the one described above in connection with FIGURES 3 to 6. Accordingly, the drive head mainly comprises a turntable base 75a upon which a bull gear is rotatable through an annular thrust bearing 75b. The bull gear, as before, is fixed to the top end of a vertical cage structure 76 surrounding the pier and carrying rake arms 77. The bull gear is rotated by one or more pinion drive units such as were described above but here not shown, causing the rake arms to convey sediment or sludge over the tank bottom to discharge substantially in the manner set forth above.

The top ends of the columns 72 are rigidly interconnected to a platform structure 78 which carries a lifting device indicated at 79 which may be similar to the one previously described. Accordingly, the lifting device has depending tension rods 80 connected to the turntable base, for raising and lowering the assembly of turntable base and rake structure. Anti-tilting stability for the rake structure is provided by a cylindrical guide member 81 fixed to the turntable base concentric therewith and extending downwardly therefrom into the hollow pier. Upon the lower end of this guide member are mounted three guide roller units 82 cooperating with respective vertical guide tracks 83 equally spaced from one another about the vertical axis of rotation of the rake structure. The units 82 have a guide roller 84 adjustable radially relative to guide member 81 and thus also relative to the associated track 83.

The centerpier construction in FIG. 10 while similar to the one in FIG. 3, is here shown stripped of the rake lifting mechanism to illustrate the convertibility feature of this invention, which allows the construction to be readily adapted for either standard operation or for rake lifting operation. Thus, the conversion from FIG. 3 to FIG. 10 may be effected simply by omitting from FIG. 3 the lifting device 47 on platform 48, the depending cylindrical guide member 54, and the upper guide bearing devices on the turntable base.

Referring to FIG. 6 it is noted that the horizontal plane P–1 of the driving torque is located favorably close to the horizontal plane P–2 of the torque reaction forces acting upon the guide columns 19 as through guide block devices 42 (see FIG. 4) or the like, the small distance between these planes being designated D.

In summary, it will be seen that this invention provides a hollow or caisson type centerpier construction of great simplicity as well as ruggedness and rigidity, featuring support columns constructed and arranged to serve as guide tracks for the vertical movement of the assembly of turntable base and rake structure. This column arrangement also supports rake lifting mechanism as well as the inner end of the radially extending bridge. In a preferred form, the columns and the cylindrical member 17 constitute a unit structure of great strength and rigidity. The vertical anti-tilting base extending between the upper guide bearing means and the lower end of the depending cylindrical guide member, provides ample anti-tilting stability for the rake structure especially during the lifting operation. The preferred triple track construction prevents binding on the tracks during the lifting operation even with the rake structure subjected to a raking load. Furthermore, the construction, according to the invention enables the sedimentation unit to be readily converted from standard operation to rake lifting operation and vice versa.

It will be understood that each of the elements, or two or more together, of the apparatus herein described, and featuring an arrangement of at least three track columns, may also find useful application in sedimentation apparatus differing from the type described above.

I claim:

1. In a sedimentation apparatus having a settling tank, said tank having a stationary base portion, the combination which comprises a rotary sediment engaging structure rotatable about a vertical axis and provided with a central vertical cage portion, a toothed bull gear fixed to said cage portion concentric with the axis of rotation of said sediment engaging structure, a turntable base supported on said base portion for vertical movement thereon, annular thrust bearing means mounted on said turntable base supporting said cage portion and bull gear for rotation on said turntable base, torque transmitting means on said turntable base in driving relationship with said bull gear for rotating said cage and sediment engaging structure relative to said turntable base, a pier structure supported on said base portion, a set of at least three vertical columns spaced evenly about said vertical axis, said columns extending from the top end of said pier upwardly through the area surrounded by said bull gear, while rigidly connected to said pier structure, complementary guide means provided on said turntable base and cooperating with respective columns for vertically guiding said turntable base while securing the same against rotation, actuating means for raising and lowering said turntable base together with said thrust bearing means, bull gear, torque transmitting means, said cage portion and sediment engaging structure, and means for imparting driving power to said torque transmitting means for rotating said sediment engaging structure on said turntable base.

2. The apparatus according to claim 1, wherein said turntable base has three openings through which respective columns extend.

3. The apparatus according to claim 1, wherein said pier structure is a hollow pier, wherein said turntable base has fixed thereto a depending guide structure extending into the hollow of said pier structure concentric with said turntable base, and wherein guide means are provided within said pier for stabilizing said depending guide structure.

4. The apparatus according to claim 1, wherein said torque transmitting means and said power imparting means comprise a pinion drive unit mounted on said turntable base.

5. The apparatus according to claim 1, wherein said bull gear is an internally toothed gear, and said torque transmitting means and said power-imparting means constitute a pinion drive unit mounted on said turntable base.

6. The apparatus according to claim 1, wherein a horizontal frame structure is provided rigidly interconnecting the top ends of said columns, and wherein said actuating means are mounted on said frame structure.

7. The apparatus according to claim 1, wherein said pier structure comprises a hollow pier, wherein said turntable base has fixed thereto a depending guide structure extending into the hollow of said pier, and wherein guide means are provided within said pier, comprising a set of three vertical tracks evenly spaced about said vertical axis, in fixed relationship to said pier, and complementary guide means provided on said depending structure cooperating with said tracks for stabilizing said depending structure.

8. The apparatus according to claim 1, wherein said complementary guide means on said turntable base are adjustable relative to said tracks.

9. The apparatus according to claim 1, wherein said turntable base comprises a horizontal top plate having openings therein through which said columns extend, an annular trough structure concentric with said axis, wherein said annular thrust bearing means are located concentric with said axis, said trough structure having an inner cylindrical wall portion connected to said top plate, and wherein said complementary guide means comprise guide members mounted on said plate, cooperating with respective columns.

10. The apparatus according to claim 1, wherein said columns are located externally of said pier structure with the lower portions of the columns extending downwardly below the top end of said pier and the upper portions extending upwardly from the top end of the pier.

11. The apparatus according to claim 1, wherein said pier structure comprises a hollow pier, wherein said columns are located externally of said hollow pier with the lower portions of the columns extending downwardly below the top end of said pier and the upper portions extending upwardly from the top end of the pier, wherein said turntable base has fixed thereto a depending guide structure extending into the hollow of said pier concentric with said turntable base, and wherein guide means are provided within said pier for stabilizing the depending guide structure.

12. In a sedimentation apparatus having a settling tank, said tank having a stationary base portion, the combination which comprises a rotary sediment engaging structure rotatable about a vertical axis and provided with a central vertical cage portion, a toothed bull gear fixed to said cage portion concentric with said axis of rotation, a turntable base supported on said base portion for vertical movement thereon, annular thrust bearing means mounted on said turntable base supporting said cage portion and bull gear for rotation on said turntable base, torque transmitting means on said turntable base in driving relationship with said bull gear for rotating said cage and sediment engaging structure relative to said turntable base, a hollow pier structure supported on said base portion, a set of at least three vertical columns spaced evenly about said axis and providing vertical tracks, said columns having a lower portion extending within the hollow of said pier structure and rigidly connected thereto, and having an upper portion extending upwardly from the top end of said pier structure, complementary guide means provided on said turntable base and cooperating with said upper portion of said columns for vertically guiding said turntable base while securing the same against rotation, actuating means for raising and lowering said turntable base together with said thrust bearing means, said bull gear, said torque transmitting means, said cage portion and said sediment engaging structure, and means for imparting driving power to said torque transmitting means for rotating said sediment engaging structure on said turntable base.

13. The apparatus according to claim 12, wherein said columns extend substantially to the bottom of said hollow pier.

14. The apparatus according to claim 12, wherein said turntable base has three openings through which respective columns extend, and wherein said complementary guide means comprise guide members mounted atop said turntable base.

15. The apparatus according to claim 12, wherein said turntable base has fixed thereto a depending guide structure extending into the hollow of said pier concentric with said turntable base, and so constructed and arranged that said columns are located in the space between the depending structure and the pier, and wherein stabilizing guide means are provided within said pier for stabilizing said depending guide structure.

16. The apparatus according to claim 12, wherein said turntable base has fixed thereto a depending guide structure extending into the hollow of the pier concentric with said turntable base, and constructed and arranged so that said columns are located in the space between the depending structure and the pier, wherein said lower portion of the columns provide vertical track means within said pier, and wherein stabilizing guide means are provided on said depending structure cooperative with said vertical tracks for stabilizing said depending structure.

17. The apparatus according to claim 12, wherein said complementary guide means are adjustable relative to said tracks.

18. The apparatus according to claim 12, wherein said torque transmitting means and said power-imparting means constitute a pinion drive unit mounted on said turntable base.

19. The apparatus according to claim 12, wherein said bull gear is an internally toothed gear, and said torque transmitting means and said power-imparting means constitute a pinion drive unit mounted on said turntable base.

20. The apparatus according to claim 12, wherein a horizontal frame structure is provided rigidly inter-connecting the top ends of said columns, and wherein said actuating means are mounted on said frame structure.

21. The apparatus according to claim 12, wherein said turntable base comprises a top plate having openings therein through which said upper portions of the columns extend, an annular trough structure containing said annular thrust bearing means concentric with said axis, and comprising an inner cylindrical wall portion connected to said top plate, and wherein said complementary guide means comprise guide members mounted on said plate cooperating with respective columns.

22. In a sedimentation apparatus having a settling tank, said tank having a stationary base portion, the combination which comprises a rotary sediment engaging structure rotatable about a vertical axis and provided with a central vertical cage portion, a toothed bull gear fixed to said cage portion concentric with said axis of rotation, a turntable base supported on said base portion for vertical movement thereon, and comprising a horizontal plate having three openings equally spaced from one another about said axis, and an annular trough portion concentric with said axis and having an inner cylindrical wall connected to the outer portion of said plate, surrounding said openings, annular thrust bearing means mounted in said trough portion and supporting said cage portion and bull gear for rotation on said turntable base, torque transmitting means on said turntable base in driving relationship with said bull gear for rotating said cage and sediment engaging structure relative to said turntable base, a hollow pier structure supported on said base portion, a set of three vertical columns spaced evenly about said axis, said columns having a lower portion extending within the hollow of said pier structure and rigidly connected thereto and having an upper portion extending upwardly from the top end of said pier structure, complementary guide means provided on said turntable base and cooperating with said upper portions of respective columns for vertically guiding said turntable base while securing the same against rotation, a depending guide structure fixed to said turntable base and extending into the hollow of said pier structure concentric with said axis, stabilizing guide means provided on said depending guide structure and cooperating with said lower portions of the columns for stabilizing said depending guide structure, actuating means for raising and lowering said turntable base together with said thrust bearing means, said bull gear, said torque transmitting means, said cage portion and said sediment engaging structure, and means for imparting driving power to said torque transmitting means for rotating said sediment engaging structure on said turntable base.

23. The apparatus according to claim 22, wherein said complementary guide means comprise guide members mounted on said plate of the turntable structure.

24. In a sedimentation apparatus having a settling tank, said tank having a stationary base portion, the combination which comprises a rotary sediment engaging structure rotatable about a vertical axis and provided with a central vertical cage portion, a toothed bull gear fixed to said cage portion concentric with said axis of rotation, a turntable base supported on said base portion for vertical movement thereon, a depending hollow guide member fixed to the underside of said turntable base concentric therewith and constituting therewith a vertically movable structure, annular thrust bearing means mounted on said turntable base supporting said cage portion and bull gear for rotation on said turntable base, torque transmitting means on said turntable base in driving relationship with said bull gear for rotating said cage and sediment engaging structure relative to said turntable base, a hollow pier structure supported on said base portion, concentric with said axis of rotation, a set of at least three vertical columns spaced evenly about said axis, said columns having a lower portion extending within the hollow of said pier structure and rigidly connected thereto, and having an upper portion extending upwardly from the top end of said pier, said columns being located in the space between said hollow pier structure and said depending guide portion surrounded by said pier structure, upper guide means provided upon the upper portion of said vertically movable structure complementary to and cooperating with respective columns for vertically guiding said movable structure while securing the same against rotation, lower guide means provided upon the lower portion of said movable structure complementary to and cooperating with respective columns, actuating means for raising and lowering said turntable base together with said thrust bearing means, said bull gear, said torque transmitting means, said cage portion and said sediment engaging structure, and means for imparting driving power to said torque transmitting means for rotating said sediment engaging structure on said turntable base.

25. In a sedimentation apparatus having a settling tank, said settling tank having a stationary base portion, the combination which comprises a rotary sediment engaging structure rotatable about a vertical axis and provided with a central vertical cage portion, a toothed bull gear fixed to said cage portion concentric with the axis of rotation of said sediment engaging structure, a turntable base supported on said base portion for vertical movement thereon, annular thrust bearing means mounted on said turntable base supporting said cage portion and bull gear for rotation on said turntable base, torque transmitting means provided on said turntable base in driving relationship with said bull gear for rotating said cage portion and sediment engaging structure relative to said turntable base, a pier structure supported on said base portion, a set of at least three vertical columns spaced evenly about said vertical axis and rigidly connected to said pier structure, and extending upwardly through the area surrounded by said bull gear, said columns providing guide tracks for vertical movement of said turntable base, vertical guide means provided on said turntable base complementary to and cooperating with respective columns for vertically guiding said turntable base while securing the same against rotation, and means for imparting driving power to said torque transmitting means for rotating said sediment engaging structure on said turntable base.

26. The apparatus according to claim 25, wherein said columns have downwardly extending portions located interiorly of said pier structure.

27. The apparatus according to claim 25, wherein said columns have downwardly extending portions located exteriorly of said pier structure.

28. The apparatus according to claim 25, wherein said pier-structure comprises a hollow shell, wherein said turntable base has fixed thereto a depending guide structure concentric with said shell, with the addition of stabilizing guide means provided within said shell for said guide structure, and actuating means for raising and lowering said turntable base together with said thrust bearing means, bull gear, torque transmitting means, cage portion, and sediment engaging structure.

29. The apparatus according to claim 25, with the addition of a horizontal frame rigidly interconnecting the upper ends of said columns.

30. The apparatus according to claim 25, with the addition of a horizontal frame rigidly interconnecting the upper ends of said columns, and a radially extending bridge structure having its inner ends supported on said frame.

31. The apparatus according to claim 25, with the addition of stabilizing guide means spaced a substantial distance downwardly from said turntable base, and effective between said sediment engaging structure and the pier.

32. In a sedimentation apparatus having a settling tank, said settling tank having a stationary base portion, the combination which comprises a center pier construction which comprises a vertical shell, means for anchoring the lower end of the shell on said base portion, and a plurality of at least three vertical support columns uniformly spaced about the vertical axis of said shell and rigidly connected thereto and providing vertical tracks, said support columns having a lower portion of substantial length extending along said shell, and an upper portion extending a substantial distance above the top end of said shell, a rake structure rotatable about a vertical axis and provided with a central vertical cage portion, a toothed bull gear fixed to said cage portion concentric with the axis of rotation of said rake structure, and surrounding said support columns, a turntable base mounted on said center pier construction and vertically movable along said tracks while secured against rotation, annular thrust bearing means mounted on said turntable base supporting said cage portion and bull gear for rotation on said turntable base, torque transmitting means provided on said turntable base in driving relationship with said bull gear for rotating said cage portion and rake structure relative to said turntable base, vertical guide means provided on said turntable base complementary to and cooperating with respective columns for vertically guiding said turntable base while securing the same against rotation, and means for imparting driving power to said torque transmitting means for rotating said rake structure on said turntable base.

33. The combination according to claim 32 wherein said support columns are disposed within said shell.

34. The combination according to claim 32 wherein said support columns are disposed within said shell, and said lower portion of the columns extends substantially the length of said shell.

35. The combination according to claim 32 wherein said support columns are disposed externally of said shell.

36. The combination according to claim 32, wherein, said turntable base has fixed thereto a depending guide structure concentric with said shell, with the additions of stabilizing guide means cooperating with the lower end portion of said guide structure within said shell.

37. The combination according to claim 36, wherein said stabilizing guide means comprise at least three vertical guide tracks uniformly spaced around the vertical axis of the shell and fixed interiorly to said shell.

38. The combination according to claim 36, wherein the lower end portion of said depending guide structure has a rim adapted for stabilizing contact with the surrounding shell.

References Cited

UNITED STATES PATENTS

| | | | |
|---|---|---|---|
| 3,200,956 | 8/1965 | Raynor et al. | 210—531 |
| 3,241,682 | 3/1966 | Cookney et al. | 210—528 |
| 3,338,827 | 8/1967 | Mausolf | 210—528 X |

JAMES L. DE CESARE, Primary Examiner